Jan. 27, 1959

S. N. BROADY 2,871,352

PULSE CIRCUIT

Filed Oct. 23, 1956

Inventor
STEPHEN N. BROADY

By [signature] [signature] Attorneys 2,871,352

PULSE CIRCUIT

Stephen N. Broady, Randallstown, Md., assignor, by mesne assignments, to the United States of America as represented by the Secretary of the Navy Application October 23, 1956, Serial No. 617,899

7 Claims. (Cl. 250—27)

The present invention relates to a pulse circuit and more particularly to a pulse circuit for generating two short pulses, the last of which may be suppressed without effect upon the first.

Prior art pulse circuits for this purpose, one of which is described herein, are characterized by having a large number of parts and complex circuitry. The pulse circuit of the present invention in contrast thereto comprises a relatively simple circuit having a small number of parts and embodies a blocking oscillator driving a modified screen coupled phantastron circuit.

Accordingly, it is an object of the present invention to provide a pulse circuit embodying relatively few parts.

It is another object of the present invention to provide a pulse circuit emboding relatively few parts, capable of generating two short pulses one of which may be suppressed without effect upon the other.

It is another object of the present invention to provide a blocking oscillator circuit of novel configuration.

It is another object of the present invention to provide a screen coupled phantastron circuit the operation of which may be controlled by a switching means.

Figures 1, 1A:
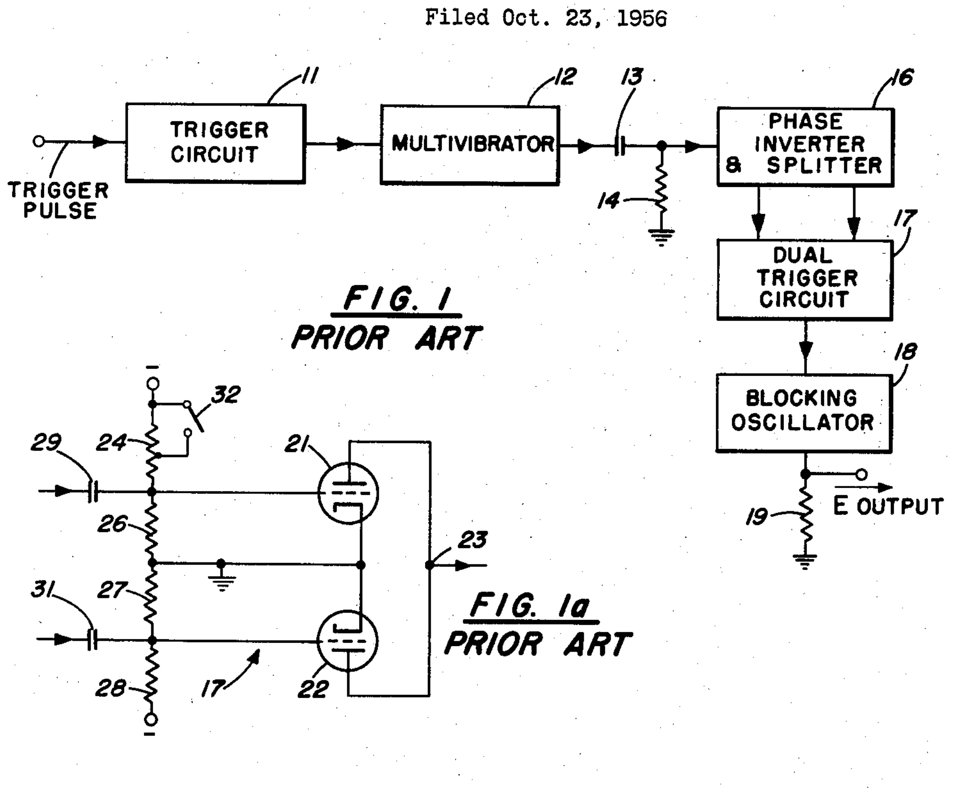
FIG. 1 PRIOR ART, FIG. 1a PRIOR ART

Other objects and many of the attendant advantages of the present invention will be readily appreciated as the same becomes better understood by reference to the following detailed description when considered in connection with the accompanying drawing wherein:

Fig. 1 illustrates a pulse circuit of the prior art.

Fig. 1*a* illustrates in detail a portion of the circuit of Fig. 1.

Figure 2:
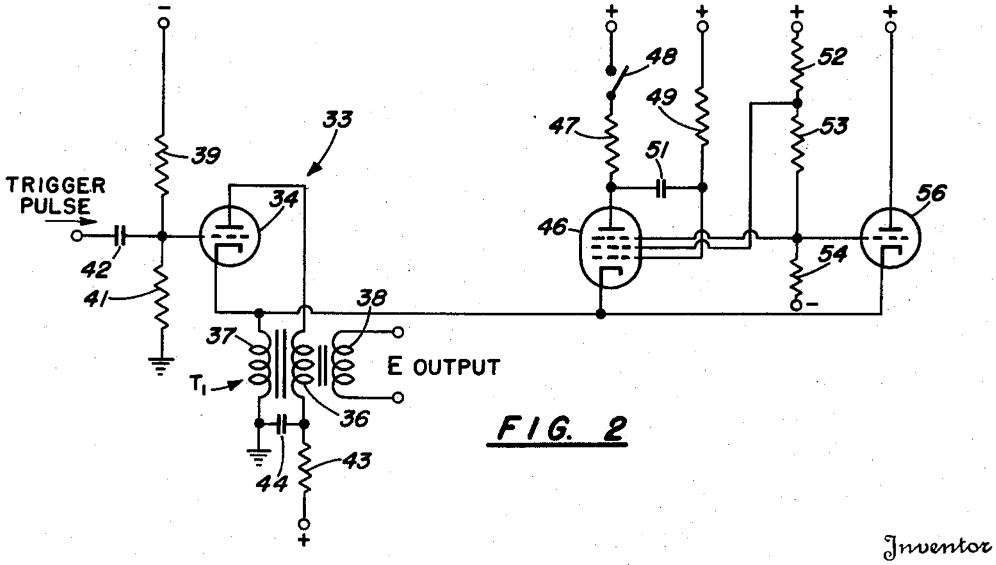

Fig. 2 illustrates a preferred embodiment of the present invention.

Referring to Fig. 1, which illustrates a pulse circuit of the prior art, there is shown a trigger circuit 11, a multivibrator 12, a differentiating network comprising a capacitor 13 and a resistor 14, a phase inverter and splitter 16, a dual trigger circuit 17 (shown in detail in Fig. 1*a*), and a blocking oscillator 18. Multivibrator 12 is triggered by a short, sharp pulse from trigger circuit 11 and the differentiated output thereof is applied to phase inverter and splitter 16 which provides a pair of output pulses coupled to dual trigger circuit 17. The output of dual trigger output 17 is applied to a blocking oscillator 18 which provides a pair of output pulses at resistor 19.

Referring to Fig. 1*a* it is seen that dual trigger circuit 17 comprises a pair of triodes 21, 22 having their anodes coupled to an output terminal 23 (connected to B+ through the plate load of blocking oscillator 18), and their cathodes connected to ground. The grids of triodes 21, 22 are connected to a bias network comprising resistors 24, 26, 27 and 28 and are coupled to phase invertor and splitter 16 by capacitors 29, 31. The ends of the bias network are connected to B— while the common terminal of resistors 26, 27 is grounded to thus maintain triodes 21, 22 non-conducting until a triggering pulse is received. If it is desired to suppress one of the output pulses, a portion of resistor 24 may be shunted by switch 32 to maintain triode 21 biased beyond cutoff.

Referring now to Fig. 2, which illustrates a preferred embodiment of the present invention, there is shown a blocking oscillator circuit generally indicated by the reference numeral 33. Blocking oscillator circuit 33 includes a triode 34 and a transformer $T_1$ comprising a primary winding 36, a secondary or feedback winding 37 and an output winding 38. The grid of triode 34 is connected to the common terminal of bias resistors 39, 40, and to one terminal of a coupling capacitor 41. The other terminals of resistors 39, 41 are respectively connected to B— and ground. The anode of triode 34 is connected to B+ through primary winding 36 and a resistor 43, while the cathode of triode 34 is connected to ground through secondary or feedback winding 37. A decoupling capacitor 44 is provided to block AC from the B+ supply.

The circuit described will oscillate provided the loop gain thereof is equal to or greater than one and windings 36, 37 are phased to provide regenerative feedback. It may be shown that for $A \geqq 1$ the following must be true:

$$(1+\mu) \geqq (N3)$$

where N is equal to the transformation ratio of windings 36, 37. If N is just 1, then any $\mu$ just slightly greater than 0 will satisfy the above condition.

Referring again to Fig. 2 it may be seen that any current that flows through triode 34 must also flow through the cathode and plate transformer windings 36, 37. Since these windings are coupled and phased to provide regenerative feedback, any change in current through one will be re-enforced by a change in like manner through the other. If $(1+\mu) >> (N3)$ the action will be violent and rapid. Assuming that a bias is derived from resistors 39, 41 such that tube 34 is operating below cut-off, no current will normally flow through either winding. If a short trigger pulse is applied to the circuit, current will flow causing the regenerative action described above. First the cathode voltage will go positive and then negative with respect to ground. When it is negative enough, current will flow into the grid circuit causing capacitor 42 to charge. The total voltage on the grid will then be equal to the bias voltage provided by resistor 39, 41 and the charge on capacitor 42. This voltage will assure that only one cycle of output is produced. If it is desired to make oscillator 33 free running, resistor 39 and the negative supply may be omitted and resistor 41 may or may not be returned to a positive suuply.

The cathode of triode 34 is directly coupled to the cathode of a pentode 46 of a modified screen coupled phantastron circuit. The anode of pentode 46 is connected to B+ through a plate resistor 47 and a switching means 48 while the control grid thereof is connected to B+ through a resistor 49 and is coupled to the anode by a coupling capacitor 51. Switching means 48 may be mechanical or electrical and may, if desired, be designed for remote operation. The screen grid of pentode 46 is connected to the common terminal of resistors 52, 53, while the suppressor grid thereof is connected to the common terminal of resistors 53, 54 and to the grid of a triode 56. The other terminals of resistors 52, 54 are connected to B+ and to B—, respectively, to thus cause resistors 52, 53, and 54 to function as a bias network.

Since the circuitry of pentode 46 is isolated and the cathode thereof is grounded, with proper biasing the screen will normally draw current, the plate will be cut-off, and the suppressor will be negative with respect to ground. If now a positive trigger is applied to the cathode, the current to the screen will decrease causing the suppressor grid to rise towards a positive potential. At the same instant the plate will start to draw current, and hence start to decrease its voltage with respect to ground. The negative step at the plate will be coupled to the grid via capacitor 51. This rapidly falling condition will prevail until an equilibrium condition is reached. At this instant the plate will tend to remain at its equilibrium voltage; but capacitor 51 will start to discharge causing a change in voltage across resistor 49. This small voltage change will be inverted, amplified and reapplied as negative feedback to the other side of capacitor 51 to prevent oscillation. From this instant until the plate bottoms, the waveform of the plate will be a linear rundown. When the plate finally does bottom, it will no longer allow an increase in current into resistor 47 and therefore the rundown will stop. The control grid potential however will continue to rise causing a further increase in cathode current. Since this current increase can no longer enter the plate circuit it will be diverted to the screen grid causing the screen voltage to drop slightly. This drop will be coupled to the suppressor grid via resistors 53, 54, which will cause the screen to draw even more current. This is a regenerative action and will very rapidly cut-off all current flow to the plate. The plate will then rise towards the B+ value. Since the control grid is coupled to the plate via capacitor 51, this element will tend to go more positive causing larger amounts of cathode current and thus improve the regenerative action causing the tube 46 to return to its quiescent condition.

The complete circuit is set into operation by the application of a short, sharp, positive trigger to the grid of triode 34 which is normally biased to cut-off by the bleeder action of resistors 39, 41 and the negative supply voltage. When the start pulse is applied to the grid, the tube starts conducting and operates as described above. The cathode of triode 34 in rapid succession first becomes positive and then negative with respect to ground. The resultant positive pulse applied to the cathode of pentode 46 triggers the phantastron circuit into operation. This pulse also appears across output winding 38. The positive square wave appearing on the suppressor of tube 46 is coupled to the grid of tube 56 and causes tube 56 to draw a large amount of current during the above described cycle of operation of the phantastron circuit. This current flows through the cathode winding 37 of transformer $T_1$. When the phantastron circuit completes its cycle, the suppressor will jump to its negative steady value and triode 56 will be abruptly cut-off. The change of current flow through winding 37 of transformer $T_1$ will cause an inductive kick which will retrigger blocking oscillator 33 to provide a second pulse in output winding 38. At this time the phantastron circuit will still be in the process of recovery so that the cycle will end at this point. Triode 56 is provided to increase the current flow through winding 37 during the cycle of operation of the phantastron circuit to make the production of the second output pulse more reliable. It is possible, however, to design the phantastron circuit to provide sufficient current magnitude and rate of change thereof to make triode 56 unnecessary. If the second pulse is not desired, switch 48 may be opened. With switch 48 opened, the circuit action will be normal for the blocking oscillator circuit but the suppressor of pentode 46 will remain negative to thus maintain tube 56 cut-off and no second output pulse will be produced.

In addition to the provision of a switch in the plate circuit of pentode 46 there are several other methods whereby the second pulse if unwanted may be suppressed. For example, the junction of resistors 53, 54 may be connected to a negative supply; the junction of capacitor 51 and resistor 49 may be connected to a negative supply; or the junction of capacitor 51 and resistor 47 may be connected to a negative supply. Further any opening of the circuit that interrupts the signal from the blocking oscillator would result in the suppression of the second pulse. While only one output circuit, output winding 38 on transformer $T_1$, has been shown, if desired, several output voltages may be obtained. For example, a sawtooth waveform is available at the plate of pentode 46, and a square waveform is available at the screen and suppressor grids of pentode 46. Further, the two output pulses or spikes may be taken directly from the cathode of triode 34 instead of from output winding 38 as shown.

Obviously many modifications and variations of the present invention are possible in the light of the above teachings. It is therefore to be understood that within the scope of the appended claims, the invention may be practiced otherwise than as specifically described.

What is claimed is:

1. A blocking oscillator comprising a triode, a transformer having a primary winding and a secondary feedback winding regeneratively coupled to said primary winding, circuit means including said primary winding connecting the anode of said triode to a source of positive potential, circuit means including said secondary feedback winding connecting the cathode of said triode to a source of reference potential, a voltage divider network, circuit means connecting the grid of said triode to a point on said voltage divider network having a potential negative with respect to the cathode of said triode to maintain said triode biased to cut-off, a capacitor having one terminal adapted to be connected to a source of trigger pulses, and circuit means directly connecting the other terminal of said capacitor to the grid of said triode and to said point on said voltage divider network.

2. A pulse generator comprising: a blocking oscillator; a screen coupled phantastron circuit; a triode amplifier; means to couple a trigger pulse to said blocking oscillator; means to couple the output of said blocking oscillator to said phantastron circuit to trigger the same; means to couple an output of said phantastron circuit to said triode amplifier to cause said triode amplifier to conduct; means to couple said triode amplifier to said blocking oscillator circuit to cause said blocking oscillator circuit to recommence its cycle of operation when said triode amplifier ceases conduction; and means to render said phantastron circuit inoperative.

3. A pulse generator comprising: a blocking oscillator which comprises a triode, a transformer having a primary winding and a secondary feedback winding regeneratively coupled to said primary winding, circuit means including said primary winding connecting the anode of said triode to a source of positive potential, circuit means including said secondary feedback winding connecting the cathode of said triode to a source of reference potential, a voltage divider network, circuit means connecting the grid of said triode to a point on said voltage divider network having a potential negative with respect to the cathode of said triode to maintain said triode biased to cut-off, a capacitor having one terminal adapted to be connected to a source of trigger pulses, circuit means connecting the other terminal of said capacitor to the grid of said triode; a screen coupled phantastron circuit; a triode amplifier; means to couple a trigger pulse to said blocking oscillator; means to couple the output of said blocking oscillator to said phantastron circuit to trigger the same; means to couple an output of said phantastron circuit to said triode amplifier to cause said triode amplifier to conduct; means to couple said triode amplifier to said blocking oscillator circuit to cause said blocking oscillator circuit to recommence its cycle of operation when said triode amplifier ceases conduction; and means to render said phantastron circuit inoperative.

4. A pulse generator comprising: a blocking oscillator which comprises a triode, a transformer having a primary winding and a secondary feedback winding regeneratively coupled to said primary winding, circuit means including said primary winding connecting the anode of said triode to a source of positive potential, circuit means including said secondary feedback winding connecting the cathode of said triode to a source of reference potential, a first voltage divider network, circuit means connecting the grid of said triode to a point on said first voltage divider network having a potential negative with respect to the cathode of said triode to maintain said triode biased to cut-off, a capacitor having one terminal adapted to be connected to a source of trigger pulses, circuit means connecting the other terminal of said capacitor to the grid of said triode; a phantastron circuit which comprises a pentode, circuit means including a load resistor connecting the anode of said pentode to a source of positive potential, circuit means including a resistor connecting the grid of said pentode to a source of positive potential, circuit means including a capacitor coupling the grid of said pentode to the anode thereof, a second voltage divider network, circuit means connecting the screen grid of said pentode to a potential point on said second voltage divider network, and circuit means connecting the suppressor of said pentode to another potential point on said second voltage divider network, said other point being at a lower potential than said first point; a triode amplifier; circuit means interconnecting the cathodes of said pentode and said triodes; circuit means connecting the suppressor grid of said pentode to the control grid of said triode amplifier; and means to render said phantastron circuit inoperative.

5. A pulse generator comprising: a first triode, a transformer having a primary winding and a secondary feedback winding regeneratively coupled to said primary winding, circuit means including said primary winding connecting the anode of said first triode to a source of positive potential, circuit means including said secondary feedback winding connecting the cathode of said first triode to a source of reference potential, a first voltage divider network, circuit means connecting the grid of said first triode to a point on said first voltage divider network having a potential negative with respect to the cathode of said first triode to maintain said first triode biased to cut-off, a capacitor having one terminal adapted to be connected to a source of trigger pulses, circuit means connecting the other terminal of said capacitor to the grid of said first triode, a pentode, circuit means including a load resistor connecting the anode of said pentode to a source of positive potential, circuit means including a resistor connecting the grid of said pentode to a source of positive potential, circuit means including a capacitor coupling the grid of said pentode to the anode thereof, a second voltage divider network, circuit means connecting the screen grid of said pentode to a potential point on said second voltage divider network, and circuit means connecting the suppressor of said pentode to another potential point on said second voltage divider network, said other point being at a lower potential than said first point, circuit means connecting the cathode of said first triode to the cathode of said pentode, and switching means in the anode circuit of said pentode.

6. The combination of claim 5 including an output winding on said transformer.

7. The combination of claim 6 including a second triode, circuit means to connect the anode of said second triode to a source of positive potential, circuit means to connect the control grid of said second triode to the suppressor grid of said pentode, and circuit means to connect the cathode of said second triode to the cathodes of said first triode and said pentode.

References Cited in the file of this patent

UNITED STATES PATENTS 2,638,549 Woodbury ------------ May 12, 1953

OTHER REFERENCES

Article entitled "Design of Phantastron Time Delay Circuits," Electronics, April 1948, pp. 100–107.

Publication entitled "Waveforms" by Chance et al., published 1949 by McGraw-Hill Book Co., Radiation Laboratory Series, p. 581, Fig. 16–12(d).